United States Patent

[11] 3,540,630

| [72] | Inventors | Richard Brown; David Graham Lacey, Chapeltown, Sheffield, England |
|---|---|---|
| [21] | Appl. No. | 731,977 |
| [22] | Filed | May 24, 1968 |
| [45] | Patented | Nov. 17, 1970 |
| [73] | Assignee | Newton, Chambers & Company, Limited Sheffield, England a British company |
| [32] | Priority | June 29, 1967 |
| [33] | | Great Britain |
| [31] | | No. 30154/67 |

[54] PASTE, CREAM AND LIQUID DISPENSING APPARATUS WHICH IS LOCKABLE AGAINST TAMPERING
4 Claims, 5 Drawing Figs.

[52] U.S. Cl. ................................................ 222/153, 222/181
[51] Int. Cl. ................................................ B67d 5/32
[50] Field of Search .......................................... 222/153, 181, 180, 181up, 182, 153up; 221/154up

[56] References Cited
UNITED STATES PATENTS

| 1,601,617 | 9/1926 | Greene | 222/153X |
| 1,885,979 | 11/1932 | Bobrick | 222/153 |
| 2,399,016 | 4/1946 | Gits | 222/153 |
| 2,605,021 | 7/1952 | Churchill et al. | 222/153 |
| 2,846,122 | 8/1958 | Jenkins et al. | 222/153 |
| 1,699,476 | 1/1929 | Morin | 221/154 |

Primary Examiner—Robert B. Reeves
Assistant Examiner—H. S. Lane
Attorneys—Wenderoth, Lind & Ponack and V. M. Creedon ABSTRACT: An apparatus for dispensing fluid substances comprises a mounting plate for attachment to a wall and a storage receptacle, associated with a charge-dispensing mechanism for the substance, removably supported by the mounting plate. The storage receptacle is provided with a lockable lid and cannot be removed from the mounting plate when the lid is locked, whereas the lid may be unlocked and it alone removed to enable the storage receptacle to be recharged.

Patented Nov. 17, 1970

RICHARD BROWN AND
DAVID GRAHAM LACEY, INVENTORS

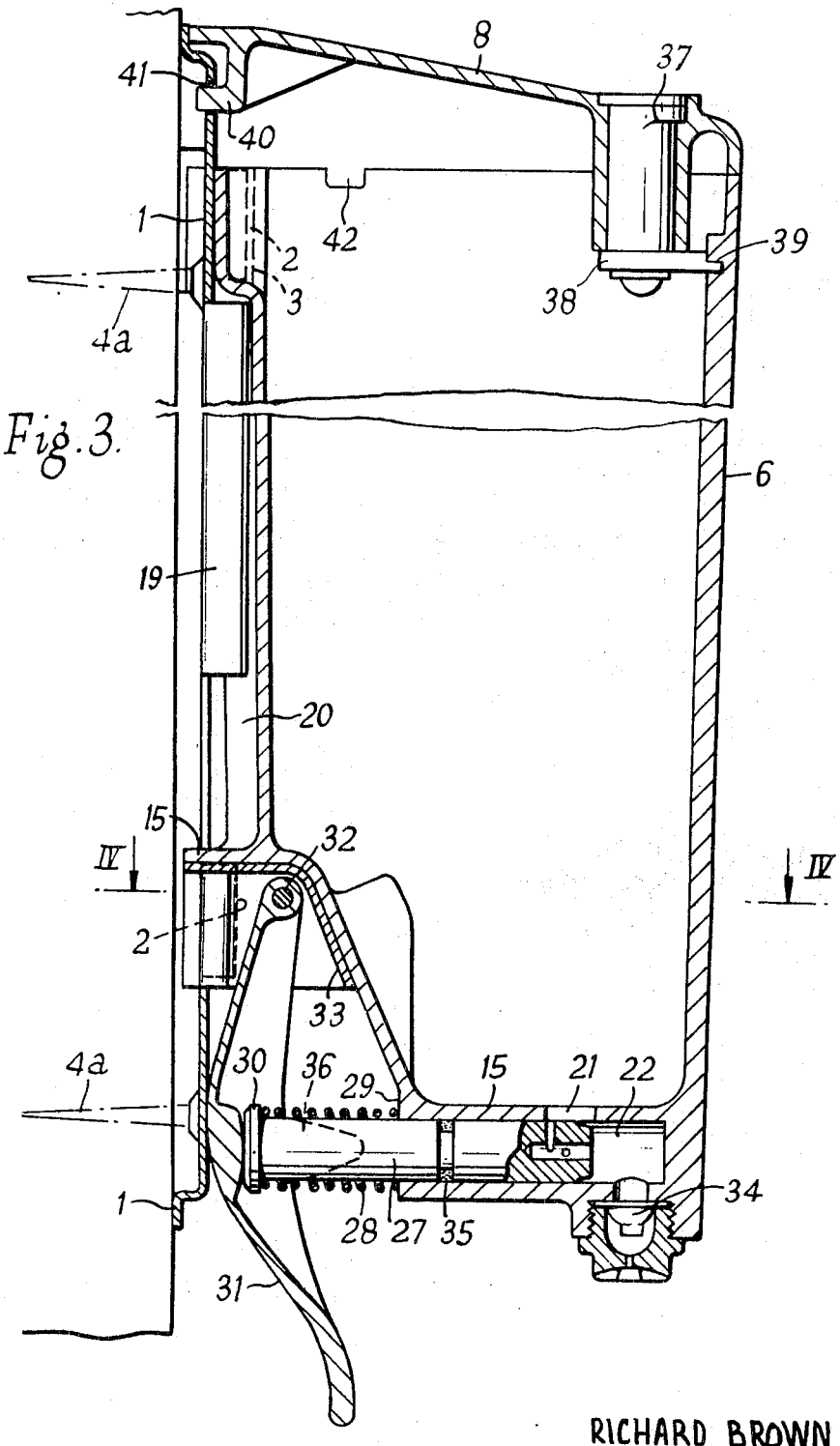

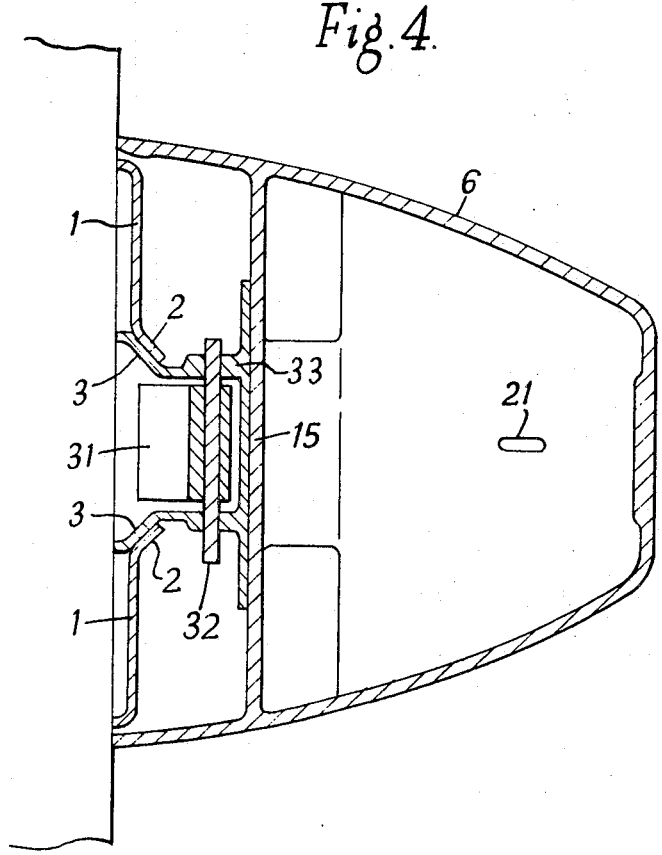

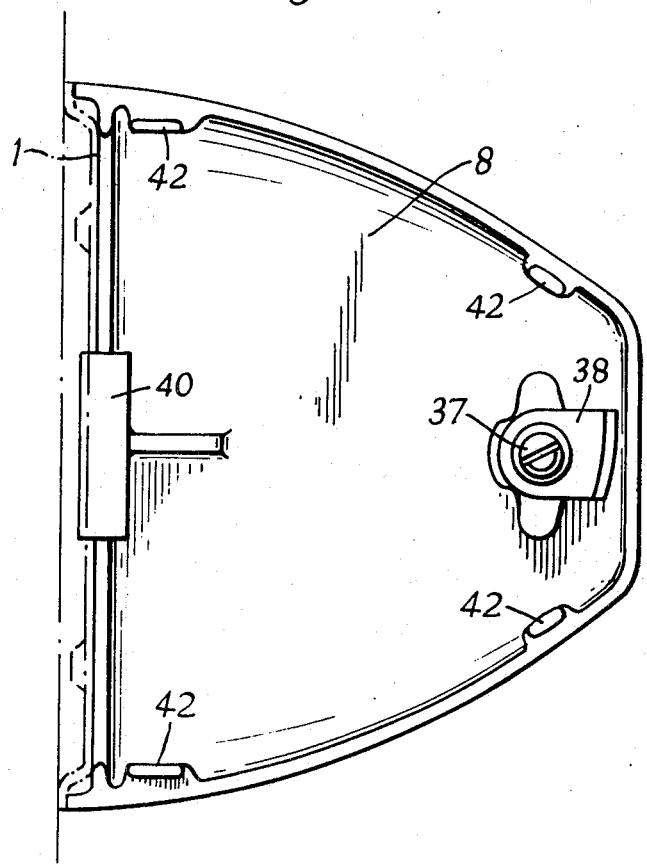

PASTE, CREAM AND LIQUID DISPENSING APPARATUS WHICH IS LOCKABLE AGAINST TAMPERING

This invention relates to apparatus for dispensing fluent substances, such as soap and other detergent or toilet preparations, foods and the like in the form of pastes, creams and liquids, hereinafter for convenience referred to as a soap dispenser.

The main object of the invention is to provide a dispensing apparatus having a storage container or receptacle which may be readily replenished with a quantity of the substance to be dispensed. A further object of the invention is to provide a dispensing apparatus in which a storage receptacle is incorporated in the body of the apparatus which houses charge-apportioning means, the body being removably mounted on and lockable to a wall bracket or other supporting means.

In accordance with this invention a dispensing apparatus comprises a mounting plate for attachment to a wall or other vertical surface, a storage receptacle for holding a substance to be dispensed, and adapted to be detachably supported by the mounting plate, a snap-type charge-dispensing mechanism incorporated in the lower portion of said storage receptacle, exteriorly operable means for actuating said charge-dispensing mechanism, and a lid for the storage receptacle, which lid is removable to enable the storage receptacle to be charged, and means including a lock for locking the lid to the storage receptacle and/or the mounting plate whereby detachment of the lid and detachment of the storage receptacle from the mounting plate are prevented so long as the lid is locked.

The charge-dispensing mechanism employed is preferably constructed as described in U.S. Pat. No. 2,898,009.

The accompanying drawings illustrate, by way of example, an embodiment of the dispensing apparatus according to the invention primarily intended for dispensing measured quantities of a fluent soap preparation. In the drawings:

FIG. 3 is a vertical sectional side view of the assembled dispenser;

FIG. 4 is a section on the line IV–IV in FIG. 3; and

FIG. 5 is an underneath plan view of the lid.

Figure 1:
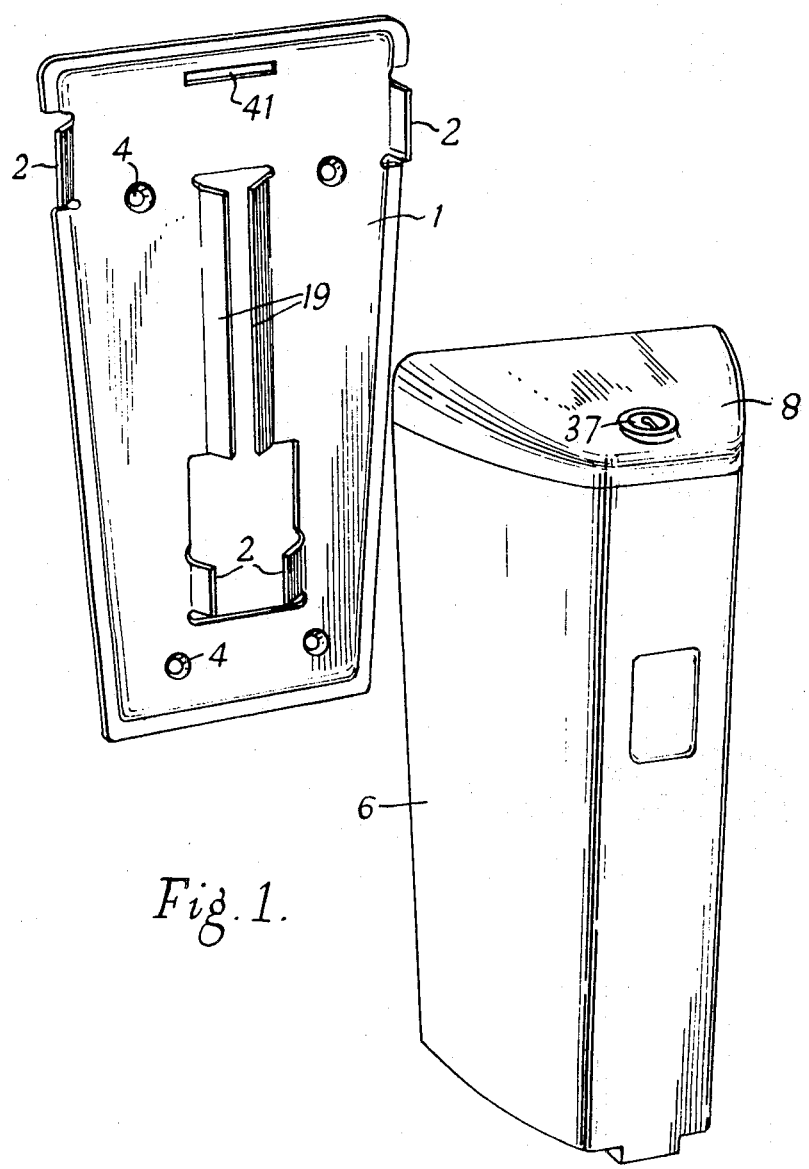
FIG. 1 is a front perspective view of the soap dispenser, showing means on the separated mounting plate to facilitate assembly of the storage receptacle.
Figure 2:
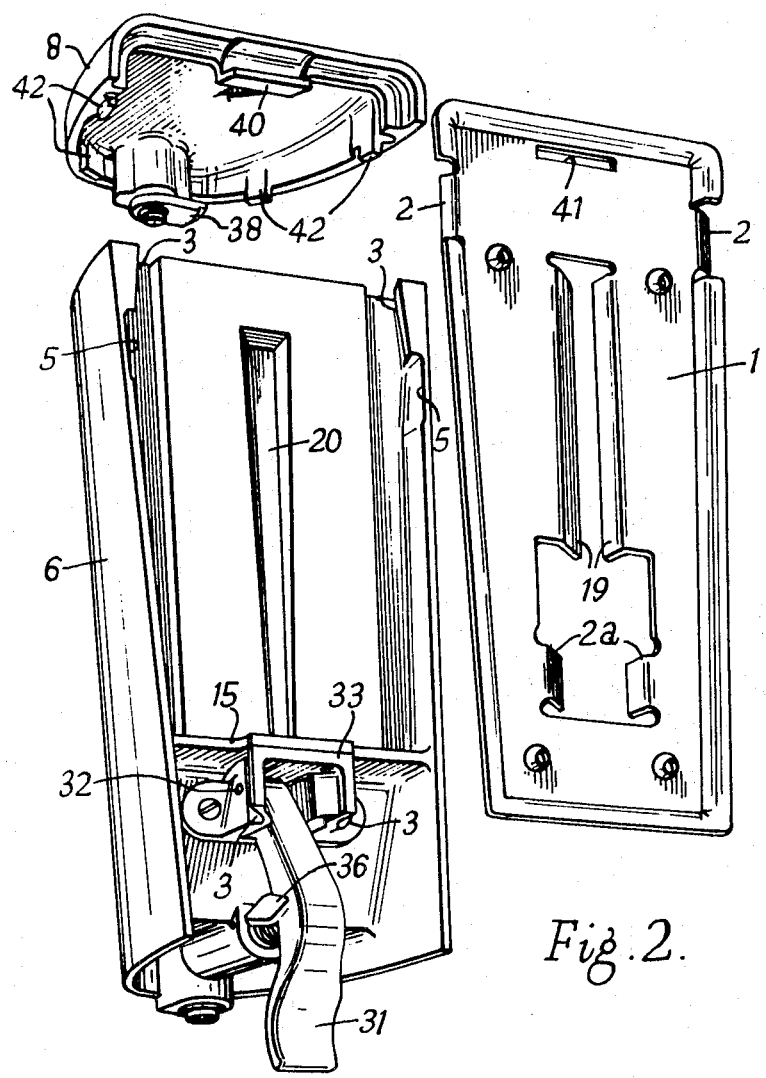
FIG. 2 is a rear perspective view, showing the lid removed from the storage receptacle, and the separated mounting plate.

In the embodiment illustrated, the mounting plate 1, preferably made of metal, is provided with countersunk screw holes 4 to receive screws 4a to secure the plate to a wall or the like. The mounting plate 1 has a plurality of tongues 2 which are bent outwardly from the plane of the mounting plate for engagement with corresponding undercut slide surfaces 3 formed on a storage receptacle 6. Portions of the wall of the storage receptacle 6 are relieved at 5 so that the upper tongues 2 of the mounting plate 1 may be positioned in alignment with the upper slide surfaces 3, the lower tongues 2 being vertically aligned beneath the lower slide surfaces 3. The storage receptacle 6 is then slid endwise downwardly with reference to the mounting plate 1 so that the slide surfaces 3 engage with the tongues 2 on the mounting plate, movement being arrested when the upper edges 2a of the lower tongues come into contact with the stepped floor 15 of the storage receptacle 6. The heads of the screws 4a which secure the mounting plate 1 to the wall are covered by the body of the storage receptacle 6 when the receptacle is assembled on the mounting plate. The storage receptacle 6 may be subsequently detached from the mounting plate 1 by vertical upwards movement to disengage the tongues 2 from the slide surfaces 3, after which the storage receptacle 6 may be easily moved forward away from the fixed mounting plate 1. Reassembly of the storage receptacle 6 on the mounting plate 1 may be facilitated by means of tongues 19 which are bent out of the plane of the mounting plate 1 engaging a groove 20 of quick-taper form provided on the rear of the storage receptacle 6. The tongues 19 and groove 20, however, are not essential.

The storage receptacle 6 is provided with a removable lid 8 constituting an end closure for the receptacle whereby the store of fluent soap preparation in the receptacle can be replenished on removal of the lid. The storage receptacle 6 and the lid 8 may be moulded in a thermoplastic material, but are preferably cast, especially die-cast, in metal. The mounting plate 1 is preferably a metal stamping or pressing and is illustrated as such, although in some apparatus the use of a die-cast mounting plate may be envisaged.

A reciprocating pump-type charge-dispensing mechanism is incorporated in the lower portion of the storage receptacle 6. An inlet port 21 in the floor 15 of the receptacle 6 communicates with the interior of a cylinder 22 within which a piston 27 is adapted to reciprocate. The piston 27 is biased rearwardly within cylinder 22 by a coiled compression spring 28 encircling said piston and interposed between the rear face 29 of the cylinder and a collar 30 on the rear extremity of the piston. The resistance of spring 28 is overcome by pressure applied to the piston collar 30 through an operating handle 31 which is hung upon a cross pin 32 mounted in a bracket 33 screwed to the floor 15 of the receptacle 6. These screws are only accessible when the storage receptacle 6 is removed from the mounting plate 1. The lower slide surfaces 3 are incorporated in the bracket 33. The bracket 33 may be made integral with the storage receptacle 6, but is made separate as described for convenience in casting.

The lower end of handle 31 depends below the storage receptacle 6 and is adapted to be exteriorly operable by the fingers of a hand-held palm uppermost, the pulling forward of handle 31 resulting in the ejection into the upturned palm of a quantity of the soap preparation discharged through a one-way self-sealing nipple valve 34, in the front end of cylinder 22. A resilient seal ring 35 around piston 27 prevents the escape of soap preparation rearwardly along the piston. The handle 31 has a forward stroke limited by contact between the front face of the piston 27 and the forward end wall of the cylinder 22; the rearward stroke is limited by contact of the handle 31 with the mounting plate 1. Stroke adjustment means may be provided if desired. If desired the piston 27 may be provided as described in U.S. Pat. No. 2,898,009 with a plurality of radial feed ports for alignment with cylinder port 21, the feed ports being located at different distances in from the front face of the piston and communicating through an axial passage in the piston with the space in front of the piston and being selectively employed by rotation of the piston about its own longitudinal axis to alter the measured charge dispensed at each stroke of the piston; this rotational setting of the piston is facilitated by making the collar 30 of square or other shape adapted to engage between forwardly extending lugs 36 on the channel-sectional handle 31. The lugs 36 are so formed that they turn the piston 27 about its longitudinal axis into the required charge-apportioning position, although the piston may have been positioned an appreciable angle offcenter, that is, up to about ±40°.

In order to prevent unauthorized access to the storage receptacle and unauthorized removal of the dispensing apparatus, the lid 8 is arranged so that it can be locked to the storage receptacle 6 and, when so locked, prevents detachment of the storage receptacle 6 from the mounting plate 1. The lid 8 incorporates an exteriorly accessible key-operated lock 37, conveniently a cylinder tumbler lock, and lock bolt 38 adapted to effect locking engagement with a recess 39 in the front wall of the storage receptacle 6. A lug 40 formed integrally with the lid 8 is adapted to engage within a hole 41 in the mounting plate 1. Depending lugs 42 formed on the lid 8 are adapted to engage the inside wall of the storage receptacle 6 to locate the lid laterally with respect to the receptacle.

The lug 40 and the hole 41 are so dimensioned and positioned that the storage receptacle 6 cannot be slid upwardly with respect to the mounting plate 1 to disengage the slide surfaces 2 and 3 while the lid 8 is in position on the storage receptacle. When the bolt 38 is engaged in within the recess 39 the lid 8 cannot be removed from the storage receptacle 6. To remove the lid, the key is inserted in the lock 37 and turned to release the bolt 38 from within the recess 39, whereupon the lid 8 can be removed by lifting forwardly and upwardly to withdraw the lug 40 from within the hole 41 in the mounting plate 1. The storage receptacle 6 may then be recharged without need to detach it from the mounting plate 1, although it may readily be detached in the manner described if it is desired to service the charge-dispensing mechanism or alter the setting of the mechanism.

It will, of course, be appreciated that the lock 37 and the lug 40 may be interchanged if desired, namely so that the lug 40 effects locking interengagement within the recess 38 and the lock 37 locks the lid directly to the mounting plate 1 instead of to the storage receptacle 6. Other modifications will occur to those skilled in the art.

We claim:

1. An apparatus for dispensing a fluent substance, comprising a mounting plate for attachment to a wall or other vertical surface, a storage receptacle for holding a substance to be dispensed, charge dispensing mechanism in the lower portion of said receptacle, and exteriorly operable actuating means therefore, means for detachably supporting said storage receptacle by said mounting plate comprising interengaging slide surfaces on said storage receptacle and said mounting plate whereby said storage receptacle may be engaged with and disengaged from said mounting plate by an endwise relative sliding movement, a lid for said storage receptacle, said lid being removable to enable said storage receptacle to be charged, and locking means including a key-operated lock fitted in said lid for locking said lid to said storage receptacle and a lug provided on said lid to effect locking interengagement with said mounting plate, whereby removal of said lid from said storage receptacle and said relative sliding movement to detach said storage receptacle from said mounting plate are prevented so long as said lid is locked, wherein said storage receptacle includes an integral floor portion and said exteriorly operable means comprise an operating handle pivotally mounted from said floor portion and adapted when swung forward to actuate said charge-dispensing mechanism in said lower portion of said storage receptacle.

2. A dispensing apparatus as claimed in claim 1, wherein said charge-dispensing mechanism includes means rendering it selectively settable for varying the charge of substance dispensed.

3. A dispensing apparatus as claimed in claim 1, wherein said lid and said storage receptacle are metal die-cast body members.

4. A dispensing apparatus as claimed in claim 1, wherein said lock is a cylinder tumbler lock.